Dec. 24, 1963    R. T. BRUMBAUGH    3,115,201
CONVEYOR WEIGHING APPARATUS
Filed Aug. 29, 1960
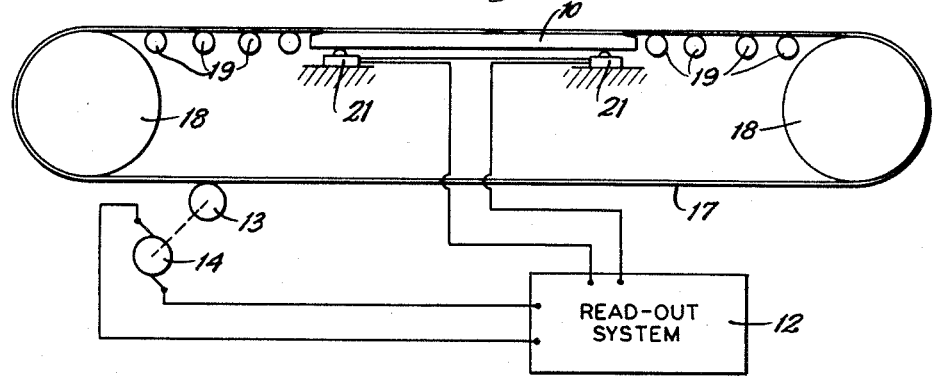
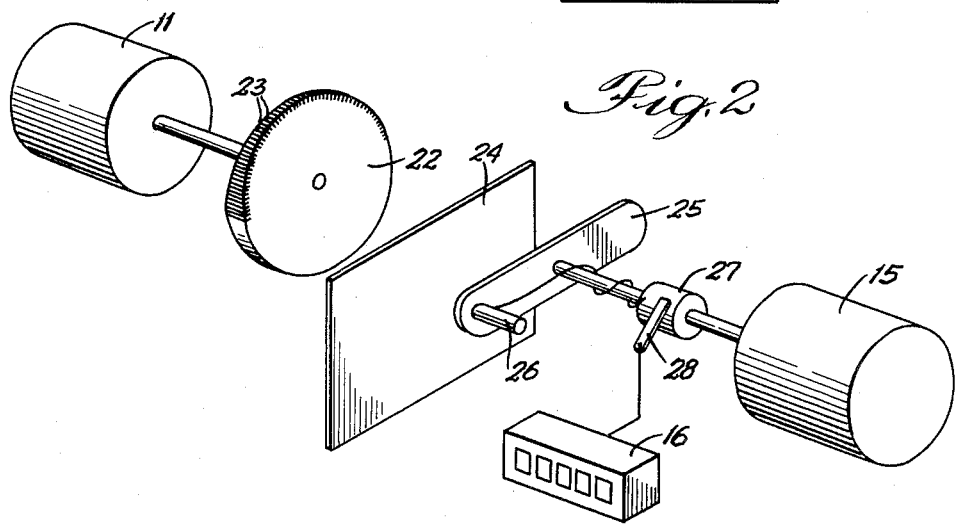
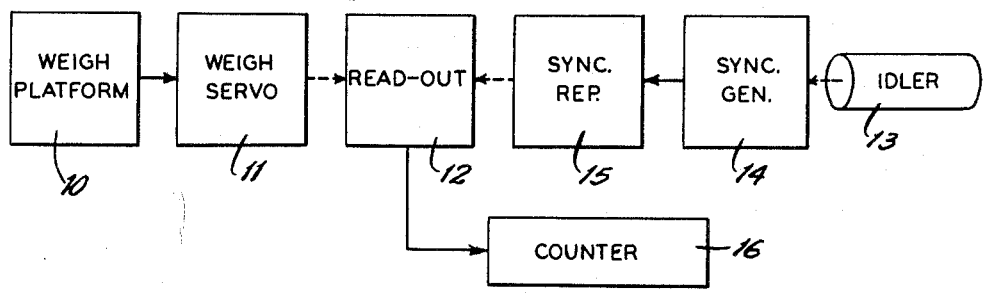
INVENTOR:
Robert T. Brumbaugh,
BY
Pair Freeman & Molinare
ATTORNEYS.

United States Patent Office 3,115,201
Patented Dec. 24, 1963

3,115,201
CONVEYOR WEIGHING APPARATUS
Robert T. Brumbaugh, Evanston, Ill., assignor, by mesne assignments, to Goodman Manufacturing Company, Chicago, Ill., a corporation of Illinois
Filed Aug. 29, 1960, Ser. No. 52,417
2 Claims. (Cl. 177—16)

This invention relates to a conveyor weighing apparatus and more particularly to a novel system for continuously weighing the load of a traveling conveyor and to an analogue to digital converter for use with such system and with similar systems.

In weighing the loads carried by traveling conveyors, it has been the usual practice to continuously weigh the load on a short length of the conveyor as it is traveling over a weighing station and integrating the load measurement with a measurement of the conveyor speed. The apparatus required for this type of weighing is relatively complicated and expensive and is extremely difficult to operate properly to obtain accurate measurements. This is particularly true of the integrating apparatus which tends to become complex and difficult to maintain in proper adjustment.

It is one of the objects of the present invention to provide conveyor weighing apparatus in which loads on a traveling conveyor can be weighed rapidly and continuously with relatively simple and inexpensive equipment.

According to the present invention, the load on a traveling conveyor is weighed by weighing successive increments in the length of the conveyor as it is traveling and arithmetically adding the increments of weight without involving integration or other complex procedures. In a preferred construction a predetermined increment in the length of the conveyor is weighed as the conveyor travels across a weighing platform and the weight measurement adjusts one element of an analogue to digital converter which is scanned by another element at time periods proportional to the conveyor speed such that successive increments in the conveyor length will be weighed with the successive digital values thus obtained being arithmetically added to obtain the total weight of the load carried by the conveyor.

Another object is to provide a novel analogue to digital converter which is simple and inexpensive in construction and rapid and accurate in operation.

According to a feature of the invention, the converter includes an angularly adjustable element formed with a series of spaced pulse-producing elements which are periodically scanned by a rotating scanning member, the adjustable element being moved relative to shielding means so that more or less of the pulse-producing elements are exposed to operate the scanning member during each rotary cycle thereof.

The above and other objects and features of the invention will be more readily apparent from the following description when read in connection with the accompanying drawing, in which:

FIGURE 1 is a diagrammatic side view of a conveyor weighing system embodying the invention;

FIGURE 2 is a diagrammatic perspective view of the analogue to digital converter of the invention; and FIGURE 3 is a block diagram.

As indicated by the block diagram, the total weight carried by a traveling conveyor is measured by measuring successive increments of weight on a weigh platform 10 and totalizing the several increments to obtain the total weight. Each increment of weight corresponds to an increment in the length of the conveyor with the several increments being weighed at time periods equal to the time required for the conveyor to travel the length of the weigh platform so that there is no duplication or overlapping of weights and so that each increment in the length of the conveyor is weighed separately. The weight of the load on the weigh platform 10, after being corrected for the weight of the conveyor itself, operates a weigh servo 11 which may comprise an electric servo motor turned to an angular position proportional to the value of the signal received by it, which is in turn proportional to the weight. The weigh servo is connected to a readout device or analogue to digital converter 12 to effect an adjustment thereof proportional to the weight.

The readout 12 is periodically operated in proportion to the speed of the conveyor so that it will operate to make a weight record each time the conveyor has traveled a distance equal to the length of the weigh platform. For this purpose, the conveyor drives an idler 13 which in turn drives a synchronous generator 14. The generator 14 supplies operating current to a synchronous motor, or repeater, 15 which in turn drives a scanning element in the readout, or converter, 12. The output of the readout, or converter, 12 is supplied to a totalizer counter 16 which will record each of the weight increments as it is supplied thereto and will totalize the several increments to indicate the total weight carried by the conveyor.

In a typical apparatus, as shown in FIGURE 1, the conveyor may comprise an endless belt 17 traveling over and driven by end rollers 18 to provide an upper horizontal run to carry the load to be weighed and a lower horizontal return run. A portion of the upper horizontal run is supported on the weigh platform 10 with portions of the conveyor adjacent to the platform being supported on idler rollers 19. As the conveyor travels over the weigh platform 10, the load thereon will be weighed to produce a weigh signal proportional to the load and which is supplied to the readout system indicated at 12.

According to the present invention, the weight on the platform 10 is sensed by load cells 21 on which the platform is supported and which produce an electrical signal proportional to the weight thereon. The use of load cells in this type of construction is highly desirable since the total deflection of the weigh platform under maximum load is an extremely small fraction of an inch so that the accuracy is not affected by deflection of the conveyor belt. The electrical signal produced by the load cells 21 is fed to the weigh servo 11. Preferably the load cells are connected in a bridge circuit in a conventional manner with the output of the bridge being supplied to the weigh servo 11 to cause it to turn to an angular position proportional to the weight on the platform 10.

The readout or analogue to digital converter is best shown in FIGURE 2 and comprises a circular disc 22 connected to the weigh servo 11 to be angularly turned thereby. Throughout one-half of its periphery, the disc 22 is formed with a series of pulse-producing elements 10 illustrated in the form of small magnetic bars 23 angularly spaced apart, the disc itself being of non-magnetic material. It will be understood that where a form of pickup other than a magnetic pickup is to be employed the pulse-producing elements would be changed accordingly to cooperate with the pickup used to produce a pulse each time the pickup passes a pulse-producing element. The lower half of the disc is shielded by a magnetic shield 24 which may be in the form of a rectangular plate of magnetic material with its upper edge lying at a diameter of the disc 22. In this way, as the disc 22 is turned more or less of the pulse-producing elements 23 will be exposed beyond the shield 24 to cooperate with the pickup. In this way, the number of pulses produced during each cycle of operation is made proportional to the weight on the platform 10. The pickup, as shown, is in the form of a bar 25 driven by the synchronous repeater 15 to make a complete revolution each time the conveyor belt has traveled a distance equal to the length of the platform 10. At one end, the bar 25 carries a pickup 26 which in the embodiment shown is in the form of a magnetic pickup to be affected by the magnetic pulse-producing elements 23 to produce an electrical pulse each time the pickup passes one of the pulse-producing elements. The pickup is connected through a slip ring 27 and a brush 28 to the counter 16 so that the counter will be advanced one unit for each pulse supplied thereto.

In operation, the synchronous repeater 15 will turn through one complete revolution which constitutes a cycle in the operation of the converter each time the belt travels through a distance equal to the length of the weigh platform. This is insured by driving the synchronous repeater from a synchronous generator which is in turn driven directly from the belt. As the pickup 26 travels over the portion of the disc 22 exposed above the top of the shield 24, it will produce, through cooperation with the pulse-producing elements 23, a number of pulses proportional to the angular adjustment of the disc 22 which is in turn proportional to the weight on the platform 10. Thus, during each cycle a number of pulses proportional to the weight on the platform will be transmitted to the counter 16 to be recorded thereby and with the pulses produced in successive cycles being added in the counter to give an indication of the total weight carried by the conveyor.

It will further be apparent that while the readout or analogue to digital converter disclosed herein is peculiarly adapted for use with the weighing apparatus of the invention, it is also capable of use in other environments for other types of operations.

While one embodiment of the invention has been shown and described herein, it will be understood that it is illustrative only and not to be taken as a definition of the scope of the invention, reference being had for this purpose to the appended claims.

What is claimed is:

1. A conveyor weighing system comprising a traveling conveyor, means continuously driving the conveyor, means including electrical load cells supporting a portion of the conveyor to produce a weight signal proportional to the weight on said portion of the conveyor, a readout device including two relatively movable parts one of which turns relatively to the other to produce a series of pulses during each turning cycle and the other of which is adjustable to determine the number of pulses produced during a cycle, an electric motor responsive to the weight signal to adjust said other of the parts, and means responsive to the speed of the conveyor to drive said one of the parts at a continuously rotating speed proportional to the conveyor speed whereby said one of the parts will turn through a complete cycle in the time required for the conveyor to travel the length of said portion thereof.

2. A conveyor weighing system comprising a traveling conveyor, means continuously driving the conveyor, means including electrical load cells supporting a predetermined portion of the length of the conveyor to produce a voltage proportion to the load thereon, a weigh responsive member, a motor responsive to said voltage to move the weight responsive member to a position representative of the weight then on said predetermined portion of the length of the conveyor, means to scan the weight responsive member in continuous cycles, and means responsive to the speed of the conveyor to drive the scanning means whereby it will complete a scanning cycle each time the conveyor travels a distance equal to said predetermined portion of the length thereof.

References Cited in the file of this patent

UNITED STATES PATENTS

| | | |
|---|---|---|
| 2,717,987 | Hagen | Sept. 13, 1955 |
| 2,747,797 | Beaumont | May 29, 1956 |
| 2,792,174 | Rutter | May 14, 1957 |
| 2,812,171 | Charbonnier et al. | Nov. 5, 1957 |
| 2,889,030 | Mottet | June 2, 1959 |
| 2,901,170 | Poole | Aug. 25, 1959 |
| 2,905,310 | Stoeckel | Sept. 22, 1959 |
| 3,042,128 | Bell et al. | July 3, 1962 |